United States Patent
Cvetkovic et al.

(10) Patent No.: US 6,236,844 B1
(45) Date of Patent: May 22, 2001

(54) PROPORTIONAL DIVERSITY RADIO RECEIVER SYSTEM

(75) Inventors: Milan Cvetkovic, Rochester; David John McCall, Brentwood; Martin Gerard Page, South Woodham Ferrers, all of (GB)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/103,131

(22) Filed: Jun. 23, 1998

(51) Int. Cl.[7] .................................................. H04Q 7/20
(52) U.S. Cl. ............................. 455/273; 455/137; 375/347
(58) Field of Search .................................. 455/45, 186.1, 455/187.1, 188.1, 132, 137, 138, 272, 273, 276.1, 266, 63, 279.1, 150.1, 139, 277.1, 134; 375/224, 227, 316, 346, 349, 347

(56) References Cited

U.S. PATENT DOCUMENTS

| | | |
|---|---|---|
| 3,934,204 | 1/1976 | Hill . |
| 4,210,871 | 7/1980 | Hill et al. . |
| 4,397,036 * | 8/1983 | Hirade et al. .......................... 455/137 |
| 4,403,343 * | 9/1983 | Hamada ................................ 455/134 |
| 4,525,869 * | 7/1985 | Hamada et al. ...................... 455/278 |
| 4,654,884 * | 3/1987 | Sakai et al. ......................... 455/183.2 |
| 4,742,563 | 5/1988 | Fukumura . |
| 4,926,498 | 5/1990 | Suzuki et al. . |
| 4,939,791 * | 7/1990 | Bochmann et al. .................. 455/137 |
| 5,345,602 | 9/1994 | Wiedemann et al. . |
| 5,379,449 * | 1/1995 | Porambo .............................. 455/297 |
| 5,603,107 * | 2/1997 | Gottfried et al. .................... 455/133 |
| 6,029,056 * | 2/2000 | Kiyanagi et al. ................. 455/276.1 |
| 6,097,773 * | 8/2000 | Carter et al. ......................... 455/137 |

FOREIGN PATENT DOCUMENTS

| | | |
|---|---|---|
| 0 221 475 | 5/1987 | (EP) . |
| 1 373 644 | 11/1974 | (GB) . |
| 1 433 590 | 4/1976 | (GB) . |
| 2 257 605 | 1/1993 | (GB) . |

* cited by examiner

*Primary Examiner*—Nay Maung
*Assistant Examiner*—Jean A Gelin
(74) *Attorney, Agent, or Firm*—Mark L. Mollon

(57) ABSTRACT

A proportional diversity radio system for mobile vehicles combats both short time delay multipath and long time delay multipath by mixing separate tuner signals obtained using separate space diversity antennas. The relative contribution of each tuner signal to a final mixed tuner output is determined in direct relation to their respective signal strength signals and inverse relation to their respective long time delay multipath noise signals.

8 Claims, 2 Drawing Sheets

PROPORTIONAL DIVERSITY RADIO RECEIVER SYSTEM

BACKGROUND OF THE INVENTION

The present invention relates in general to space diversity radio receivers with spaced antennas, and more specifically, to a diversity radio receiver system with proportional mixing of output signals from different tuners attached to different spaced antennas.

Space diversity radio receiver systems are a well known attempt to reduce the effects of multipath distortion in mobile receivers. Multipath distortion is a localized effect resulting from interaction between signals from a transmitter which traverse different paths to reach a receiving antenna. By switching between spaced antennas in a diversity radio receiver, specific multipath events can be avoided since the spacing of the antennas helps insure that not both of the antennas will experience the same multipath event at the same time.

In short time delay multipath, reflected radio signals from nearby objects combine in anti-phase with the direct radio signal at certain locations resulting in the partial or total cancellation of the signal. An undesirable burst of noise known as a "spit" or "pop" is heard as the signal to noise ratio of the received signal decreases. When a vehicle antenna passes through these multipath points, the signal strength voltage detected in the radio tuner decreases momentarily due to the decreased signal strength at the antenna. Proportional diversity systems are known, such as described in patent application GB-2257605, wherein audio signals from separate tuners connected to separate diversity antennas are combined in a manner proportional to the signal strength measured at each tuner. Since the signal strength voltage drops for a particular tuner during a multipath event, its relative contribution to the combined signal is likewise decreased. This provides an improvement in the audio signal during short time delay multipath events by attenuating the spits which may be present at one antenna, but not at the other.

Long time delay multipath is a type of multipath distortion which cannot be accurately detected by monitoring the signal strength voltage and which therefore has gone uncorrected by prior art systems. In longtime delay multipath, reflected radio signals from more distant objects (e.g., 500 meters or more from the receiving antenna) combine with the direct radio signal. Due to the longer time delay between the signals, the signals are not correlated and therefore do not cause a cancellation of the received signal but rather the superposition or overlap of the signals' frequency spectra. This spectral overlap causes audio distortion which is not accompanied by a drop in the signal strength (in fact, the signal strength may increase), and, as a result, prior proportional diversity systems do not provide an improvement under these conditions.

SUMMARY OF THE INVENTION

The present invention provides the advantage that long time delay multipath events can be detected and corrected, so that all types of multipath distortion are minimized.

In one aspect, the invention provides a proportional diversity radio system for a mobile vehicle having first and second space diversity antennas. The first tuner is connected to one of the antennas and produces a first tuner output signal in response to a broadcast signal at a selected broadcast frequency. The first tuner also produces a first signal strength signal. The second tuner is connected to the other one of the antennas and produces a second tuner output signal in response to the broadcast signal at the selected broadcast frequency. The second tuner also produces a second signal strength signal. A proportional mixer combines the first and second tuner output signals to produce a mixed tuner output signal. The first and second tuner output signals proportionally contribute to the mixed tuner output signal in response to at least one mix control signal. The mixer control detects multipath distortion in each of the first and second tuner output signals caused by long time delay multipath conditions. The mixer control generates the mix control signal in response to the first and second signal strength signals and in response to the detected long time delay multipath distortion.

DETAILED DESCRIPTION OF PREFERRED EMBODIMENT

Figure 1:
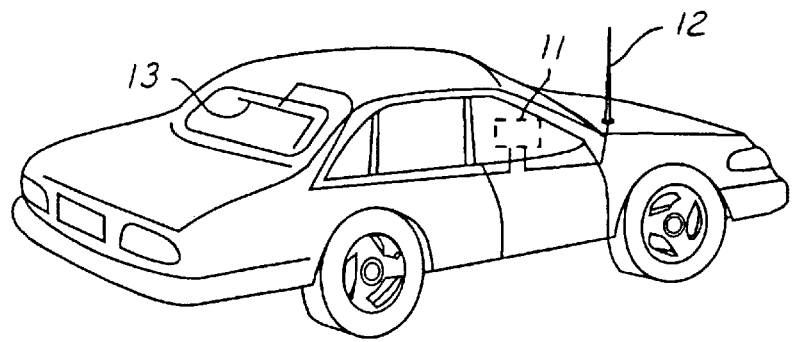
FIG. 1 is a perspective view of a mobile vehicle having space diversity antennas mounted thereon.

Referring to FIG. 1, a mobile vehicle 10 includes a proportional diversity radio receiver 11 connected to a pair of antennas 12 and 13 in a dual tuner proportional diversity radio system. Antenna 12 is shown as a vertical whip or mast antenna while antenna 13 is shown as an on-glass conformal antenna. The antennas are connected to receiver 11 via appropriate transmission lines. Mounting one antenna near the front of the vehicle and a second antenna near the rear of the vehicle maximizes their spacing distance and provides the greatest ability to minimize multipath events. The space diversity antennas need not be identical or have identical electrical properties. Antenna type and placement may be largely dictated by styling requirements and aesthetic factors for a vehicle. In addition, the present invention can be expanded to more than two antennas.

Figure 2:
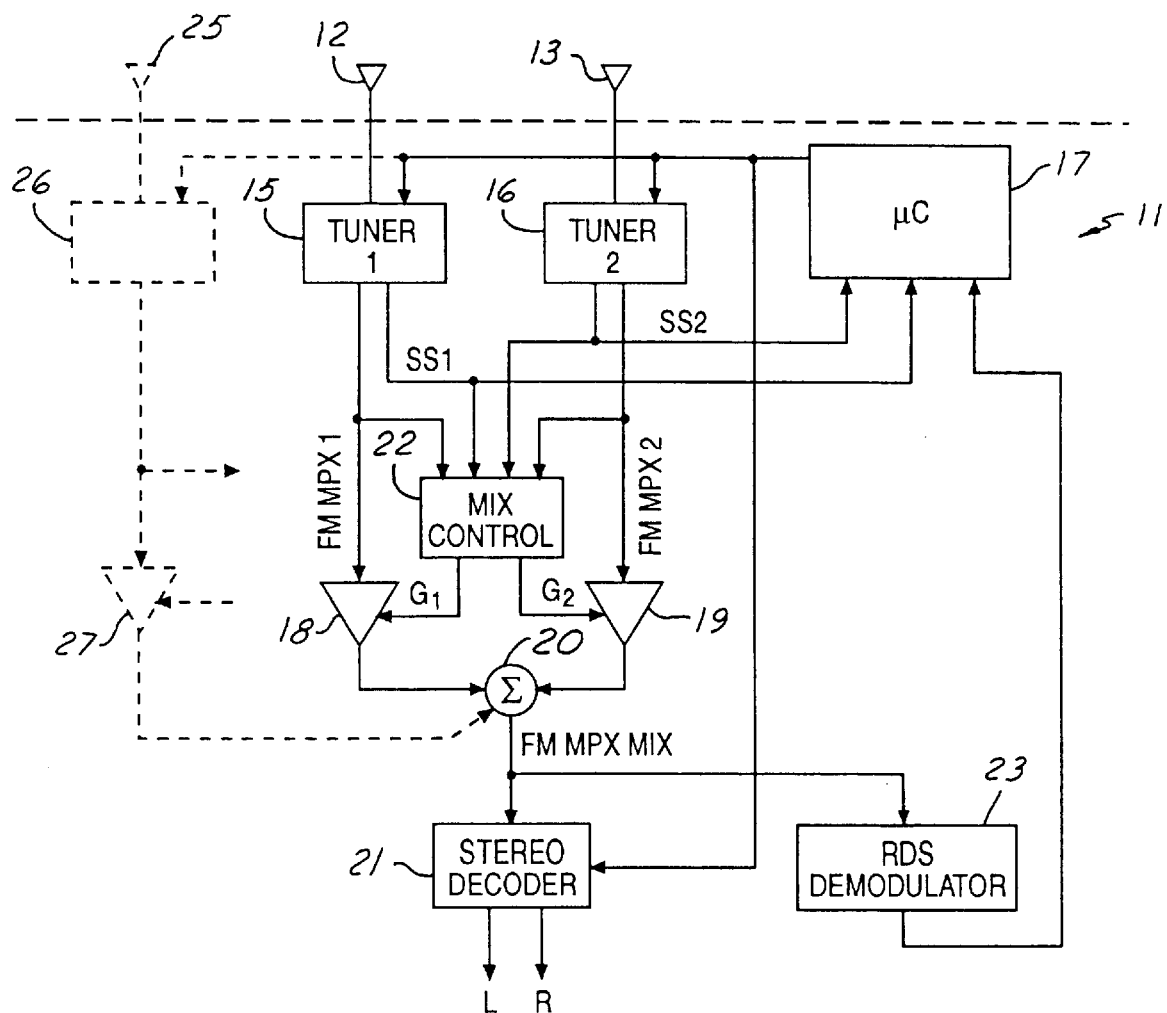
FIG. 2 is a block diagram showing the proportional diversity radio system of the present invention.

Referring to FIG. 2, various elements of receiver 11 will be described in greater detail. A first tuner 15 is connected to antenna 12 and a second tuner 16 is connected to antenna 13. Tuners 15 and 16 operate under control of a microcontroller 17 which responds to user commands (not shown). In a preferred embodiment, receiver 11 may be an FM receiver (such as a Radio Data system (RDS) FM receiver) and tuners 15 and 16 produce the modulated FM multiplex signals FM MPX 1 and FM MPX 2, respectively. These multiplex signals are provided to a proportional mixer including voltage-controlled amplifiers 18 and 19, respectively. The outputs of amplifiers 18 and 19 are added in a summer 20 for producing an FM MPX MIX signal which is a mixed tuner output signal that is provided to a stereo decoder 21.

Tuners 15 and 16 also produce respective signal strength signals SS1 and SS2 which are provided to microcontroller 17 and to a mix control circuit 22. Mix control circuit 22 also receives as inputs the FM MPX 1 and FM MPX 2 signals from tuners 15 and 16, respectively. Mix control circuit 22 provides gain control outputs $G_1$ and $G_2$ to voltage-controlled amplifiers 18 and 19, respectively. Gain control outputs $G_1$ and $G_2$ are generated to provide a substantially constant sum, i.e., the FM MPX MIX signal from summer 20 has a constant output level with no audio modulation.

In a preferred embodiment, receiver 11 is an RDS receiver. Thus, the FM MPX MIX signal from summer 20 is also provided to an RDS demodulator 23 which provides the demodulated RDS data to microcontroller 17.

The present invention is expandable to more than two diversity antennas. Thus, a third antenna 25 may be connected to a third tuner 26 which would also be under control of microcontroller 17. A tuner output signal from third tuner 26 would be provided to a voltage-controlled amplifier 27 and to mix control circuit 22. Amplifier 27 would receive a gain control signal from mix control circuit 22 and would provide a controlled gain output to an input of summer 20.

Figure 3:
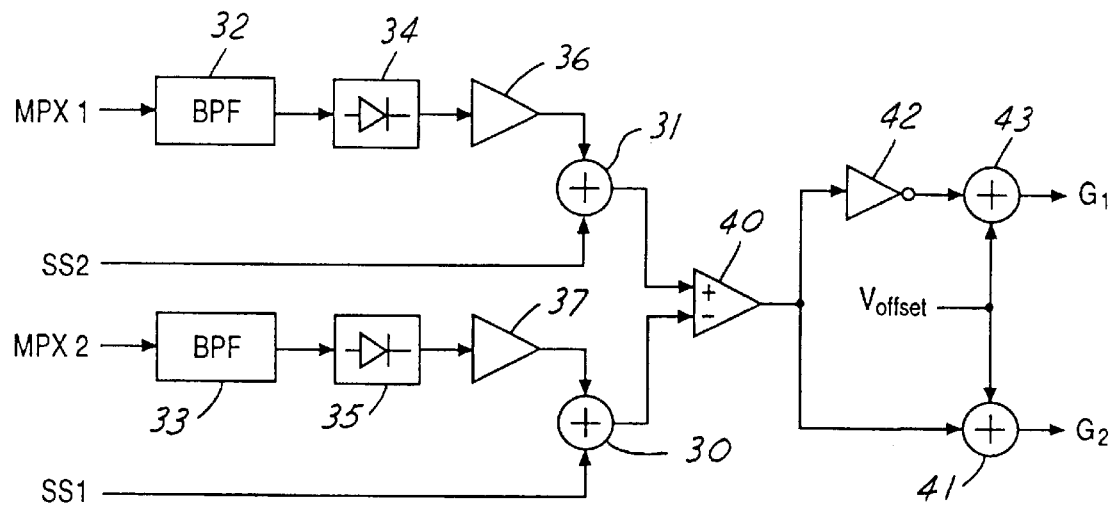
FIG. 3 is a block diagram showing a mix control circuit in greater detail.

The operation of mix control circuit 22 will be described in more detail with reference to FIG. 3. In order to produce an output signal having a minimum contribution from multipath distorted signals, the first and second tuner output signals are proportionally mixed according to their respective signal strengths and their respective contamination with multipath distortion. More particularly, the relative proportion of each tuner output signal is included in the mixed tuner output signal in direct relation to its respective signal strength signal and in inverse relation to its respective multipath noise. Thus, signal strength signal SS1 is coupled to one input of a summer 30 and signal strength signal SS2 is connected to one input of summer 31. The FM MPX 1 signal is coupled to the input of a bandpass filter 32 while the FM MPX 2 signal is connected to the input of a bandpass filter 33. The outputs of bandpass filters 32 and 33 are connected through rectifier-detectors 34 and 35, respectively, to fixed-gain amplifiers 36 and 37. The outputs of amplifiers 36 and 37 are connected to respective inputs of summers 31 and 30.

The output of summers 30 and 31 are connected to respective inverting and non-inverting inputs of a differential amplifier 40. The output of differential amplifier 40 is connected to one input of a summer 41 and through an inverter 42 to one input of a summer 43. An offset $V_{offset}$ is coupled to the second inputs of summers 41 and 43. Summer 43 provides a gain control output $G_1$ and summer 2 provides gain control $G_2$.

The passbands of bandpass filters 32 and 33 cover a frequency range above the frequencies originally broadcast in the radio signal (i.e., above the intended information content in the FM MPX signals). For example, in the preferred FM RDS receiver embodiment, a filter bandpass from about 100 kHz to about 500 kHz is employed. The spectral overlap caused by long time delay multipath results in unwanted spectral distortion components after demodulation which extend well beyond the audio bandwidth of the MPX signal. The spectral energy is isolated in bandpass filters 32 and 33. The noise energy is converted to a longtime delay multipath noise signal after rectifying and amplifying the outputs of bandpass filters 32 and 33. Rectifier-detectors 34 and 35 may preferably also include a lowpass filter characteristic for averaging the rectified noise signal. Amplifiers 36 and 37 are provided to adjust the relative weighting of the long time delay multipath noise signal to the short time delay multipath signal strength signal.

In operation, when the diversity inputs to the radio receiver are substantially the same in terms of signal quality and signal strength, the output of differential amplifier 40 is substantially zero. Consequently, gain control output signals $G_1$ and $G_2$ are substantially equal to the offset voltage $V_{offset}$. Since the gain control voltages are equal, each tuner has an equal relative contribution to the mixed output signal. If one signal strength signal indicates a relatively greater signal strength than the other, then the inputs to differential amplifier 40 are consequently shifted apart so that the gain control signal corresponding to the tuner having the greater signal strength signal increases and provides a relatively greater contribution to the mixed output. However, if a noise signal corresponding to an individual MPX signal increases, then the corresponding gain control signal for that tuner decreases, since the noise signal inputs to the summers are swapped with respect to the signal strength signals. In other words, an increase in noise signal from MPX 1 tends to increase the difference between the inputs to differential amplifier 40 which is inverted in inverter 42 and which decreases gain control signal $G_1$.

The arrangement of summers 41 and 43 receiving offset voltage $V_{offset}$ and the direct and inverted output from differential amplifier 40, insures that the total gain provided by the summed voltage-controlled amplifier outputs is constant under all conditions so that operation of the proportional diversity system does not affect the reproduced audio level. In the event that three or more tuner/antenna pairs were used, the gain control signals from the mix control circuit would still be generated in a suitable manner to keep the output level from summer 20 constant.

Figure 4:
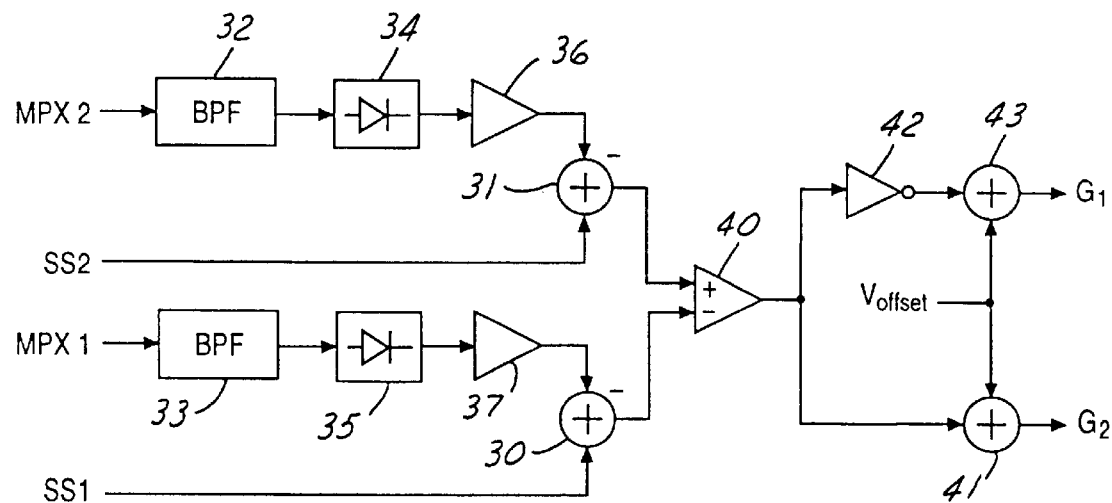
FIG. 4 is a block diagram showing an alternative embodiment of the mix control circuit.

FIG. 4 shows an alternative embodiment wherein the inputs from MPX 1 and MPX 2 have been exchanged. However, their respective summer inputs are changed to subtracting inputs. Thus, the result is the same as for FIG. 3.

The foregoing use of proportional mixing responsive to both short and long time delay multipath greatly reduces the effect of multipath distortion on audio reproduction. Further improvement in quality can be obtained as shown in FIG. 2 by controlling stereo blend and high frequency cut in stereo decoder 21. Thus, signal strength signals SS1 and SS2 are processed in microcontroller 17 along with the long time delay multipath signals from mix controller 22 in order to detect excessive multipath conditions which may not be entirely removed by proportional mixing (e.g., when both diversity signals experience multipath distortion simultaneously). By reducing stereo separation or by rolling off high frequencies in the audio signal, the spits or pops related to multipath distortion can be masked.

It will be apparent to those skilled in the art that mix control 22 could alternatively be implemented within the microcontroller, using the logic explained above.

What is claimed is:

1. A proportional diversity radio system for a mobile vehicle having first and second space diversity antennas comprising:

a first tuner for connecting to one of said antennas, said first tuner producing a first tuner output signal in response to a broadcast signal at a selected broadcast frequency, and said first tuner producing a first signal strength signal;

a second tuner for connecting to the other one of said antennas, said second tuner producing a second tuner output signal in response to said broadcast signal at said selected broadcast frequency, and said second tuner producing a second signal strength signal;

a proportional mixer combining said first and second tuner output signals to produce a mixed tuner output signal, said first and second tuner output signals proportionally contributing to said mixed tuner output signal in response to at least one mix control signal; and a mixer control detecting multipath distortion in each of said first and second tuner output signals caused by long-time-delay multipath conditions, said mixer control generating said mix control signal in response to said first and second signal strength signals and in response to said detected multipath distortion.

2. The system of claim 1 wherein said mixer control comprises first and second noise detectors for detecting said multipath distortion and generating first and second noise signals, each noise detector including a respective noise bandpass filter and a rectifier.

3. The system of claim 2 wherein said mix control signal produces a relative proportion of each tuner signal in direct relation to its respective signal strength signal and in inverse relation to its respective noise signal.

4. The system of claim 1 wherein said first and second tuner output signals are comprised of demodulated FM multiplex signals, and wherein said system further comprises a stereo decoder coupled to said proportional mixer decoding stereo content of said mixer tuner output signal.

5. The system of claim 1 wherein said mobile vehicle has a third spaced diversity antenna, said system further comprising a third tuner for connecting to said third spaced diversity antenna, said third tuner providing a third tuner output signal to said proportional mixer and a third signal strength signal to said mixer control.

6. A method of proportionally combining radio signals from space diversity antennas in a mobile vehicle, comprising the steps of:

producing a first tuner output signal in response to a broadcast signal at a selected broadcast frequency received at a first space diversity antenna;

producing a first signal strength signal corresponding to said first space diversity antenna;

producing a second tuner output signal in response to said broadcast signal at said selected broadcast frequency received at a second space diversity antenna;

producing a second signal strength signal corresponding to said second space diversity antenna;

detecting multipath distortion in each of said first and second tuner output signals caused by long-time-delay multipath conditions; and proportionally combining said first and second tuner output signals to produce a mixed tuner output signal, said first and second tuner output signals proportionally contributing to said mixed tuner output signal in response to said first and second signal strength signals and in response to said detected multipath distortion.

7. The method of claim 6 wherein said step of detecting multipath distortion is comprised of:

bandpass filtering each of said first and second tuner output signals over a frequency range above frequencies originally broadcast in said radio signals to produce first and second noise signals, respectively; and rectifying said first and second noise signals.

8. The method of claim 7 wherein said mixed tuner output includes a relative proportion of each tuner signal in direct relation to its respective signal strength signal and in inverse relation to its respective noise signal.

* * * * *